United States Patent
Scherman et al.

(10) Patent No.: US 10,699,009 B2
(45) Date of Patent: Jun. 30, 2020

(54) AUTOMATIC MALICIOUS SESSION DETECTION

(71) Applicant: Microsoft Technology Licensing, LLC, Redmond, WA (US)

(72) Inventors: Mathias Scherman, Tel Aviv (IL); Roy Levin, Haifa (IL); Yotam Livny, Gadera (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 165 days.

(21) Appl. No.: 15/908,661

(22) Filed: Feb. 28, 2018

(65) Prior Publication Data

US 2019/0266325 A1 Aug. 29, 2019

(51) Int. Cl.
| | |
|---|---|
| G06F 21/55 | (2013.01) |
| G06N 3/08 | (2006.01) |
| G06F 16/33 | (2019.01) |
| G06F 21/56 | (2013.01) |
| G06N 3/04 | (2006.01) |
| H04L 29/06 | (2006.01) |
| G06F 40/289 | (2020.01) |
| H04W 12/12 | (2009.01) |

(52) U.S. Cl.
CPC ........ *G06F 21/554* (2013.01); *G06F 16/3347* (2019.01); *G06F 21/552* (2013.01); *G06F 21/562* (2013.01); *G06F 40/289* (2020.01); *G06N 3/0454* (2013.01); *G06N 3/08* (2013.01); *H04L 63/1416* (2013.01); *G06F 2221/034* (2013.01); *H04L 63/14* (2013.01); *H04W 12/12* (2013.01)

(58) Field of Classification Search
CPC ..................................................... G06F 21/554
See application file for complete search history.

(56) References Cited

U.S. PATENT DOCUMENTS

| | | | |
|---|---|---|---|
| 8,639,625 B1* | 1/2014 | Ginter | G06F 21/10 705/50 |
| 2011/0083181 A1 | 4/2011 | Nazarov | |
| 2016/0329044 A1 | 11/2016 | Cao et al. | |
| 2017/0300966 A1* | 10/2017 | Dereszynski | G06Q 30/0254 |
| 2017/0318035 A1 | 11/2017 | Baughman et al. | |
| 2019/0095320 A1* | 3/2019 | Biswas | G06F 11/3688 |

OTHER PUBLICATIONS

"International Search Report and Written Opinion Issued in PCT Application No. PCT/US2019/018446", dated Apr. 5, 2019, 11 Pages.

* cited by examiner

*Primary Examiner* — Simon P Kanaan
(74) *Attorney, Agent, or Firm* — Workman Nydegger (57) ABSTRACT

Malicious computer behavior is detected automatically based on a user session. A user session comprising a sequence of process events is identified and a text-based representation is generated, wherein process events correspond to words and a sequence of words corresponds to a sentence. Subsequently, a text-based classifier classifies the session as malicious or non-malicious based on the sequence of events within the session in the text representation.

20 Claims, 8 Drawing Sheets

AUTOMATIC MALICIOUS SESSION DETECTION

BACKGROUND

Cloud service providers afford computing resources to individuals and businesses over the Internet thereby allowing customers to rent standardized hardware and software rather than purchasing the hardware and software. Costs previously borne by the end customer, including security, are now expected from cloud service providers. However, it is difficult to distinguish between legitimate and malicious interaction especially in view of the massive scale associated with cloud services.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automatic detection of malicious sessions. A user session, comprising a sequence of process events, can be identified. A text representation can be generated for the user session, wherein each process event corresponds to a word and sequences of process events, or words, correspond to a sentence. A text-based classifier can be employed to classify text representations of sessions as malicious or non-malicious based on the sequence of process events in the text representation. Various types of machine learning can be employed to implement the text-based classifier to enable automatic and accurate detection of malicious sessions including artificial neural networks.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Details below generally pertain to automatically detecting malicious sessions. As opposed to legitimate users, attackers seek to utilize computers for malicious purposes including, but not limited to, misappropriating resources, stealing data, and running programs that will cause damage to other users. After attackers gain access to computers, many adopt similar behaviors. Attackers use common tools and perform similar chains of actions. Such malicious behavior within a session can be detected automatically. Moreover, the characteristics of such malicious behavior, or footprint of attack, can be learned and utilized to automatically identify similar malicious behavior.

More specifically, user sessions, comprising a sequence of process events, can be identified. Subsequently, a text-based representation of the user session can be generated. For instance, process events can correspond to words and sequences of words can correspond to sentences. The text-based representation of each session can be classified with a text-based classifier as malicious or non-malicious based on the sequence of process events, or words, within a session, or sentence. Machine learning can be employed to implement the text-based classifier to enable the classifier to learn to identify the same and similar patterns of malicious behavior. In one instance, supervised learning can be employed with respect to training an artificial neural network based on labeled training data from a variety of sources.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
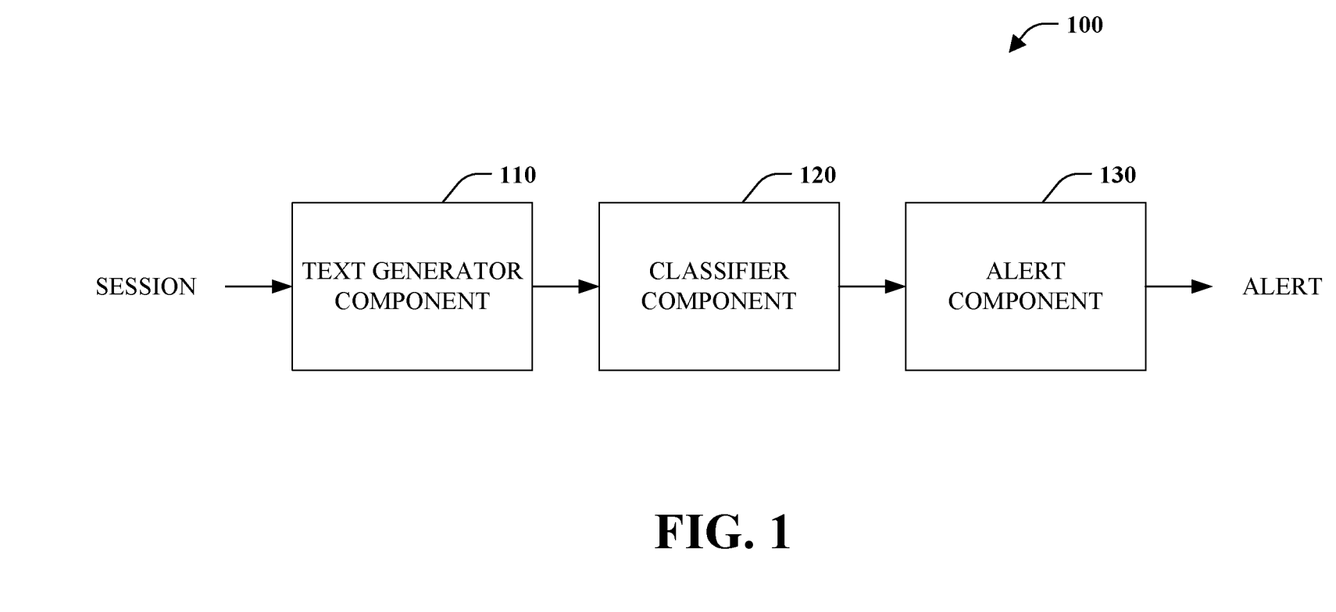
FIG. 1 is a schematic block diagram of a malicious session detection system.

Referring initially to FIG. 1, a malicious session detection system 100 is illustrated as a schematic block diagram. The malicious session detection system 100 includes text generator component 110, classifier component 120, and alert component 130. The text generator component 110 receives a login session and generates a text-representation of the session. The classifier component 120 receives the text representation of the session and classifies the session as malicious or non-malicious. The alert component 130 alerts a designated party of a malicious session.

The text generator component 110 provides a means for generating a text representation of a user session. A user session, or simply a session, is a sequence of process events that occur while a user is logged into a computer, network, or network-accessible service. In other words, a user session includes an ordered set of process events that occur after a user logs in to a machine or service and until the user logs out of the machine or service. The text generator component 110 generates a text or pseudo-text representation of a user session including words and sentences. For example, a process event including a process name and zero or more parameters can be encoded as a word, and sequences of words (i.e., process events) can be encoded as sentences.

The classifier component 120 provides a means to classify a session as malicious or non-malicious. The classifier component 120 can be text based meaning it operates with respect to text input. The classifier component 120 can receive the text representation of sessions from the text generator component 110 and perform an analysis to determine whether the session is malicious or benign. In one instance the classifier can produce a probability, confidence level, or prediction score associated with whether or not a session is malicious or not. For example, the classifier component 120 can indicate that there is a 92% chance the session is malicious, or in other words, the session is identified as malicious with 92% confidence. The opposite is also true for this example in that there is an 8% chance the session is non-malicious, or the session is classified as non-malicious with 8% confidence.

The classifier component 120 can implement machine learning to learn to classify sessions based on training data. The machine learning can enable the classifier component 120 to not only be able to detect previously observed malicious behavior but similar behavior not yet observed based on characteristics of a previous malicious behavior. In other word, machine learning enables the classifier to learn the footprint of an attack.

Further, the classifier component 120 can operate in a similar manner to classify sessions as malicious or non-malicious as a classifier that classifies sentiment of a sentence as positive or negative. In fact, in one embodiment, existing underlying technology that supports such sentiment analysis, or other natural language processing, can be exploited and adapted to classify sessions as malicious or non-malicious after the session is translated to a text representation.

The alert component 130 provides a means for alerting a designated party of a malicious session. The alert component 130 receives the output of the classifier component 120, which can provide a predictive score indicative of the likelihood that a given session is malicious. If the score exceeds a predetermined threshold, the user session can be tagged as malicious and a designated party (e.g., entity or individual), such as a security analyst, can be alerted. The alert can take on any form of notification such as a console alert, text message, email, or other communication medium or mechanism. Information conveyed in the alert can include the process event names and zero or more parameters as well as a confidence score computed by the classifier component 120, among other things.

Figure 2:
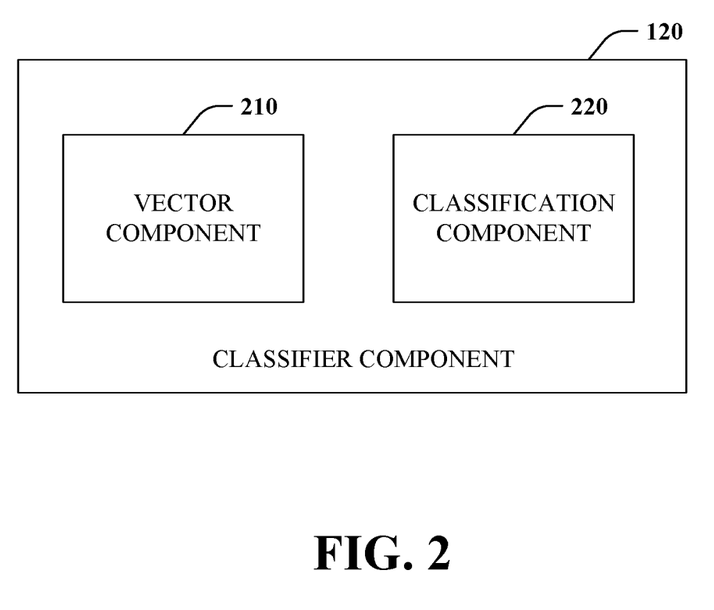
FIG. 2 is a schematic block diagram of a classifier component.

Turning attention to FIG. 2, a representative classifier component 120 is illustrated in further detail. The classifier component 120 includes vector component 210 and classification component 220. The vector component 210 transforms text to a vector representation, and the classification component 220 utilizes vector input to train and ultimately perform intelligent classification of user sessions.

The vector component 210 provides a means for mapping a text representation of a session to a vector representation. For instance, the vector component 210 can take words as input and convert the words to vectors of numbers. The vector representation can be encoded in a manner that captures the meaning of words. In accordance with one implementation, the vector component 210 can be implemented with an unsupervised artificial neural network. For example, the vector component 210 can implement an autoencoder that is a feedforward neural network having an input layer, an output layer, and one or more hidden layers connecting the input layer and output layers. The one or more hidden layers encode mappings between words and vectors based on context of the words (e.g., words that appear together in a sentence). For example, a word processing process/word may be closely related to a spreadsheet process/word but not a video game process/word based on cooccurrence in sessions/sentences. There are also different models for implementing this functionality including continuous bag of words, wherein a word is predicted given a context, and skip-gram wherein the context is predicted given a word.

The classification component 220 is able to classify user sessions presented by vectors as malicious or non-malicious (e.g., benign). In one instance, the classification component 220 can be implemented with a supervised artificial neural network. The artificial neural network can use labeled training data to learn patterns of processing events that correspond to malicious behavior. Further the artificial neural network can be a convolutional neural network. Convolutional neural networks have the ability to locate patterns processing events the correspond to malicious behavior no matter where they appear, for example, beginning, middle, or end of session. This is analogous to the way a convolutional neural network, originally designed for image recognition, can detect image features no matter how they are transformed (e.g., translated, scaled, rotated . . . ) by virtue of a convolution operation, which match parts or features at different locations.

Figure 3:
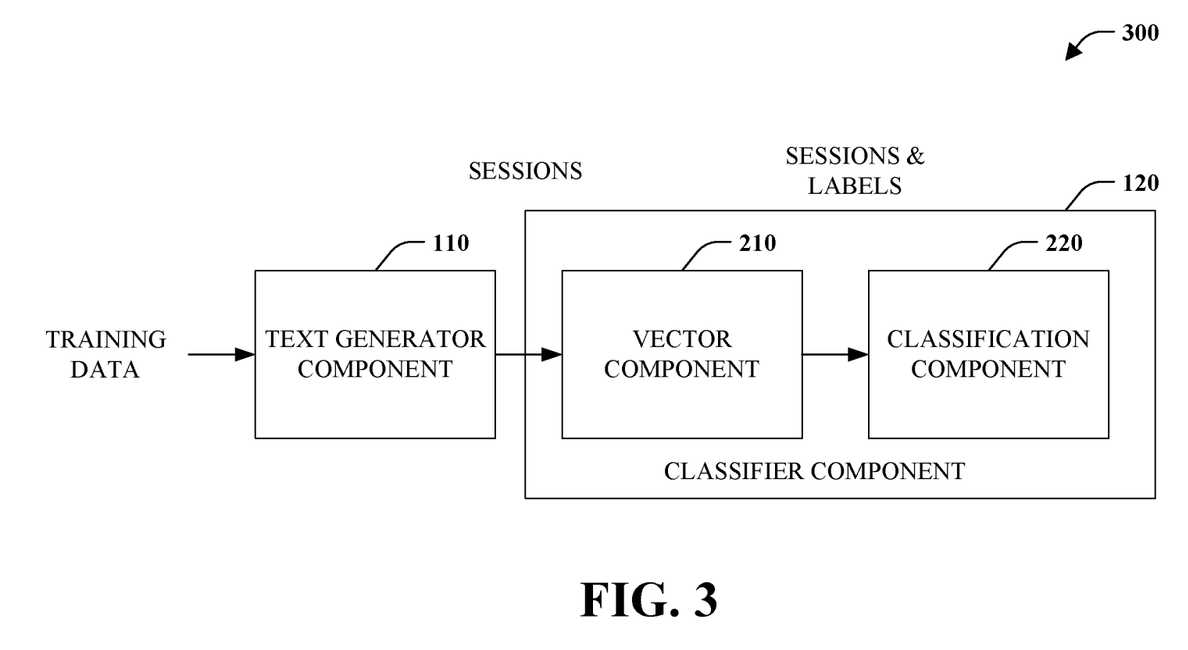
FIG. 3 is a schematic block diagram of classifier component training.

FIG. 3 is a block diagram of a system 300 for training a classifier. The system 300, similar to system 100 of FIG. 1, includes the text generator component 110 and the classifier component 120. Further similar to FIG. 2, the system 200 includes the vector component 210 and the classification component 220. Of course, this is solely one way in which the classifier component 120 can be implemented. However, for clarity this particular embodiment is described.

The text generator component 110 receives training data, or a training corpus, which can include sessions, and component process events, as well as labels indicating whether the session is malicious or benign. Sources of training data can be numerous and varied. As one example, a source can be a honeypot which is a computer security mechanism set up to attract attackers. A honeypot can comprise data on a computer that appears legitimate but is monitored and isolated. Anyone who logs on to such a computer is thus an attacker, and the sequence of process events is malicious. Further in the context of a cloud service provider, the provider can have access to activities on many computers as well as automatic or manual labels indicating whether the data is malicious or non-malicious. For example, sessions associated with a known malicious internet protocol (IP) address obtained from threat intelligence or other detection methods can be labeled as malicious. The text generator component 110 converts at least a portion of the training data into text, which is used by a text-based classifier, such as classifier component 120, to learn patterns of malicious and non-malicious activities.

In one particular embodiment, the vector component 210 can learn, by way of unsupervised learning, the meaning of words in training data, and encode words as vectors. The vector component 210 builds a mapping between words and vectors of numbers based on context of words. The vector component 210 can thus determine the meaning of words by word neighbors or the company the word keeps. For example, if words appear together in many sentences their vector representations can be similar while words that do not typically appear together can have very different vector representations. The vector representation of training data text can be provided to the classification component 220.

The classification component 220 receives a vector representation of training data as well as a label indicating whether or not the data is malicious. The training data can correspond a vector representation of a session comprising an ordered set of process events. Unlike the vector component 210, the classification component 220 can employ supervised learning with training data labels. In this manner the classification can be trained to have high precision (e.g., true positive/(true positive+false positive) and recall (e.g., true positive/(true positive+false negative) in accurately identifying sessions as malicious and non-malicious.

Figure 4:
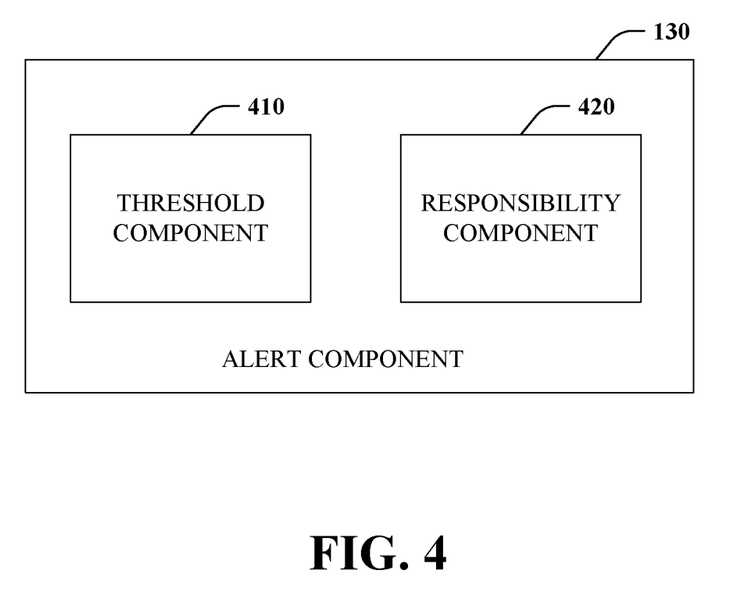
FIG. 4 is a schematic block diagram of an alert component.

FIG. 4 illustrates a representative alert component 130 in further detail. The alert component includes threshold component 410 and responsibility component 420. Output of the classifier component 120 is input to the alert component 130. The classifier component 120 outputs a numerical score that indicates the likelihood that a session is malicious as opposed to non-malicious or benign. The threshold component 410 sets a predetermined threshold value to trigger an alert. For example, the threshold component 410 can indicate that any score that indicates that the session has an eighty percent or higher chance of being malicious can trigger an alert, while any lesser score would not. Once triggered, the alert component 130 can alert a designated party (e.g., entity or individual), such as a security analyst. The alert can include information helpful to further determine whether a session is malicious including a unique session identifier and/or login identifier as well as the sequence of process events comprising an identified session.

The responsibility component 420 can provide further helpful information regarding which process is most responsible for the malicious classification. In one instance, for "n" process events, "n–1" grams can be considered. For each sub-group or subsequence of "n–1" process events, a score can be computed in the same or similar manner as the classifier component 120 produces a score for the full sequence. Scores of the groups can be compared with the score of the full sequence to determine the maximum difference. From the group with the maximum difference in score, the process event missing from the group is determined. It is this process event that is most responsible for the maliciousness of the session. By way of example, consider a full sequence or session of process events "A, B, C," with a maliciousness predictive score of ninety percent. Subsequences of this session "A, B" "A, C" and "B, C" can be scored. Assume the predictive score of "A, B" is fifty percent and the predictive scores of "A, C" and "B, C" are eighty percent. In this case, the group with the maximum difference between its score and the score of the entire sequence is "A, B." The process event not included in the sequence "A, B" is "C," which means "C" is the most responsible for maliciousness. This information can be provided with an alert as additional information.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. For example, the classifier component 120 and the responsibility component 420 can employ such technologies to infer malicious activity.

Figure 5:
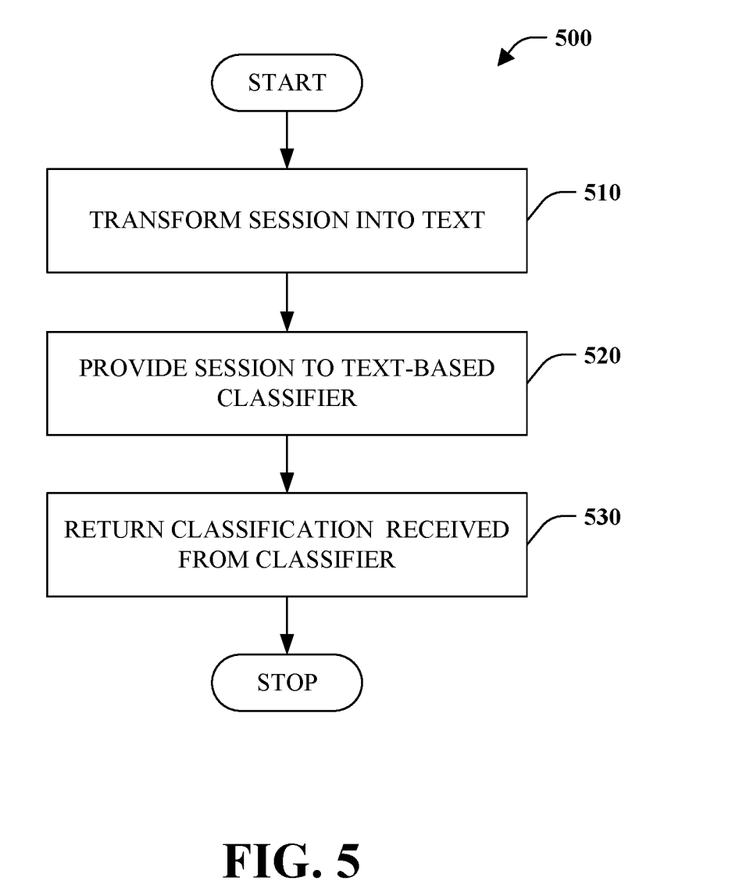
FIG. 5 is a flowchart diagram of a method of automatic malicious session detection.
Figure 6:
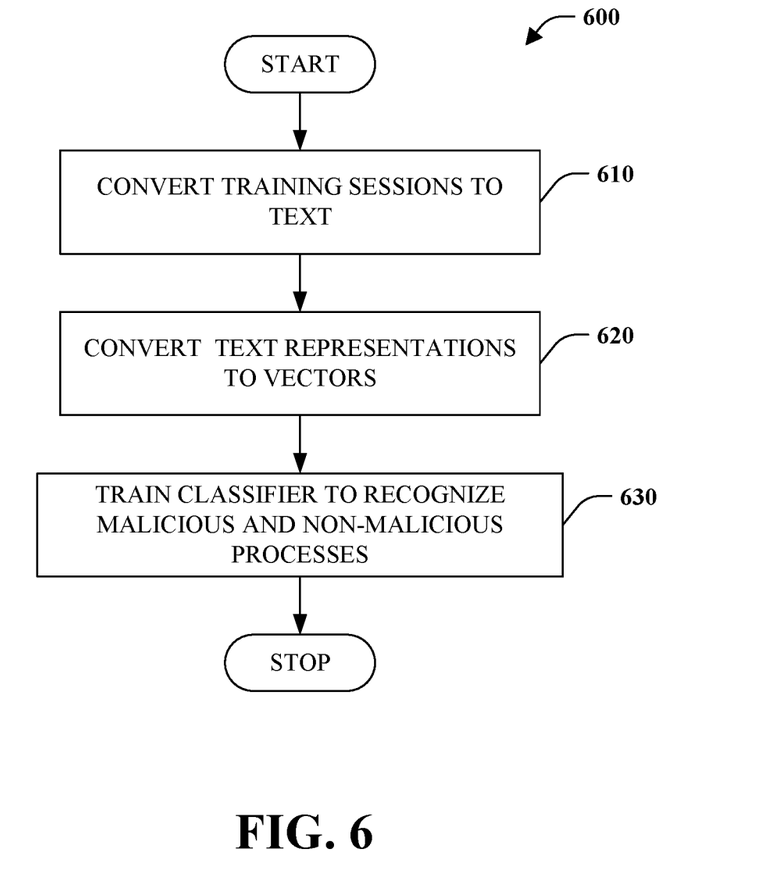
FIG. 6 is a flowchart diagram of a method of training a session classifier.
Figure 7:
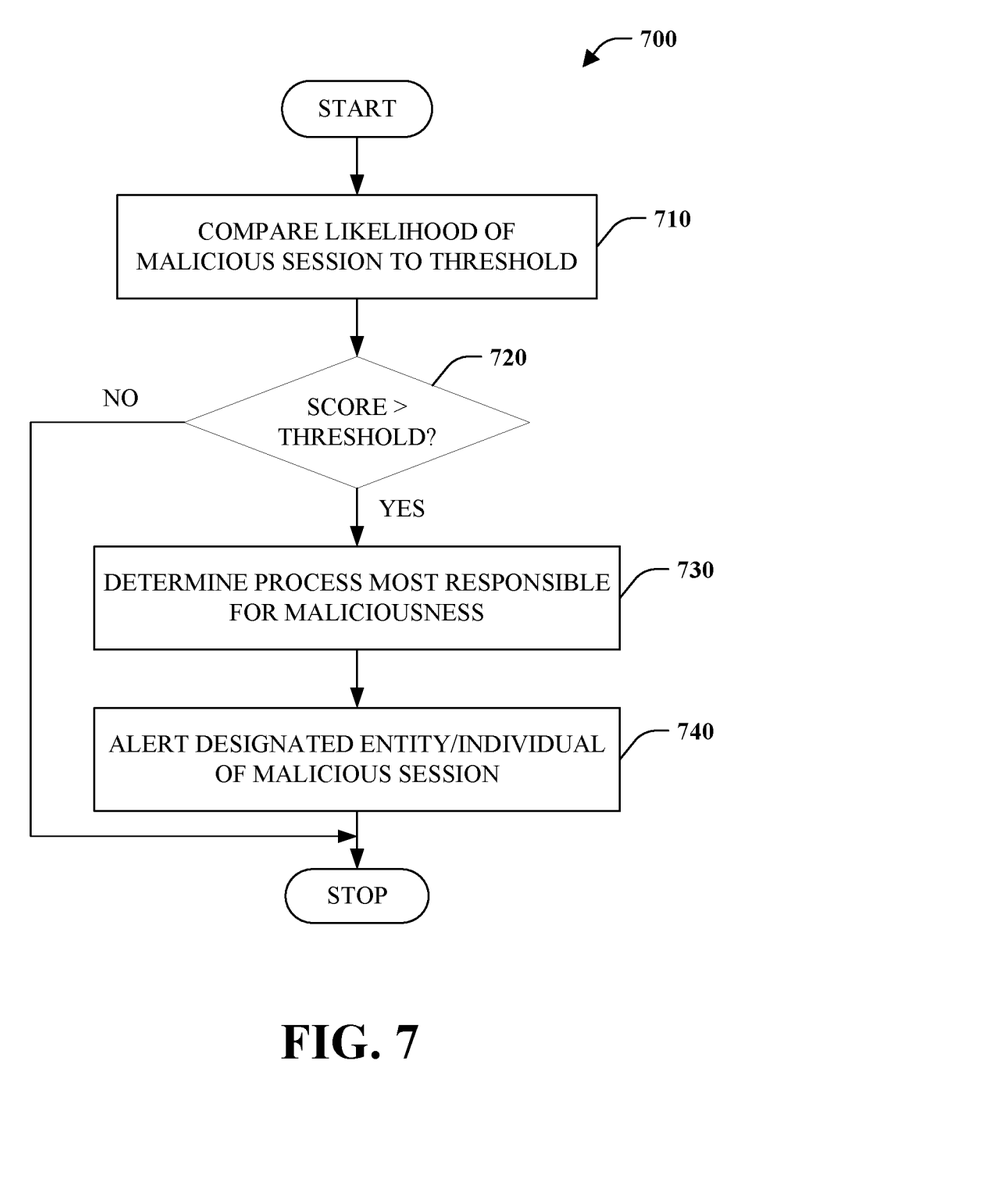
FIG. 7 is a flowchart diagram of a method of malicious session alerting.

In view of the exemplary systems described above, methodologies that may be implemented in accordance with the disclosed subject matter will be better appreciated with reference to the flow charts of FIGS. 5-7. While for purposes of simplicity of explanation, the methodologies are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter.

FIG. 5 illustrates a method of automatic malicious session detection 500. At reference numeral 510, a session is transformed into text, or in other words, a text representation of a session is generated. When a user logs in to a computer, network, or service, a unique session and identifier are produced. The user session, or simply session, can include process events triggered by user during the session prior to a user logging out. These process events are ordered sets of process events including process parameters. The session, and component process events, are transformed into text or pseudo text for subsequent processing. For example, a session can correspond to a sentence comprised of process events representing words in a session language.

At reference numeral 520, the text representation of the session is provided to a text-based classifier. The classifier can utilize conventional or novel machine learning technology that is trained to enable accurate classification of computer sessions as malicious or non-malicious. More specifically, the classifier can produce a predictive score indicative of the likelihood that a session is malicious or non-malicious. Further, various natural language classifiers such as sentiment analysis systems that identify positive and negative sentiment can be adapted to identify malicious and non-malicious sessions. Various machine learning technologies including autoencoders, artificial neural networks, and convolutional neural networks, among others can be utilized in conjunction with supervised and unsupervised learning to classify computer sessions. Convolutional neural networks have an advantage in distinguishing between malicious and non-malicious sessions in that they are specifically suited for analysis of an ordered corpus of elements such as session process events. Further, convolutional neural networks work by applying a convolution operation to a corpus thus preserving order while being invariant to translation.

At reference numeral 530, the classification computed by the classifier can be returned. For instance, the classification result can be output to a designated entity or individual. The classification can include a predictive score that indicates the probability that a particular session is malicious as opposed to non-malicious or benign. Additional information can also be output including the session and processing events comprising the session for further consideration and remedial action.

FIG. 6 is a flowchart diagram of a method 600 of training a session classifier such as classifier component 120. At reference numeral 610, a training session is converted to text or pseudo text. For example, a session can correspond to a sentence, and process events, which occur during the session, can be represented as words. At 620, the text representation of sessions is converted to vectors. For example, an auto encoder or other technology can be employed to create a map of text to vectors of numbers. The mapping can be learned based on context of words. For instance, if words appear together in many sentences (e.g., "king" and "queen") their vector representations can be similar while words that do not typically appear together (e.g., "king" and "computer") can have very different vector representations. At numeral 630, a classifier is trained to recognize malicious and non-malicious, or benign, process events. The training can be performed by way of the training sessions specified in vector representation. In one embodiment, supervised learning can be employed for training the classifier. In this case, in addition to the vector representation of sessions, labels associated with those sessions are input that designated the session as either malicious or non-malicious. The classifier can be any conventional or novel classifier implemented with machine learning technology such as artificial neural networks and convolutional neural networks.

FIG. 7 is a flow chart diagram of a method 700 of malicious session alerting. At reference numeral 710, a predictive score indicating the likelihood that a session is malicious is compared to a threshold. The threshold is configurable and can be set to substantially any value. However, the threshold can be specified so that only those sessions with a sufficiently high likelihood the session is malicious can trigger alerting. At numeral 720, a determination is made as to whether the predictive score exceeds the threshold. If the predictive score is less than the threshold, the method 700 can simply terminate or move on to processing the next session. If the predictive score is greater than the threshold, the method continues at 730, where a process most likely responsible for the maliciousness can be determined. For example, for "n" processes, "n–1" grams or subsequences can be identified. For each subsequence, a score can be computed in the same or similar manner as the classifier for the entire session. The predictive score for the subsequences can be compared with a score for the entire sequence to determine the subsequence with the greatest difference from the score for the entire session. The subsequence with the greatest difference can be analyzed to determine which process event was not present in the subsequence, which is the process event most responsible for the maliciousness of the session. At reference numeral 740, a designated entity or individual, such as a security analyst, can be alerted that a session has been detected which is likely malicious. Information provided with the alert can include, but are not limited to, the session identifier, the sequence of process events and parameters, and a process event that most likely contributed to the malicious classification.

In accordance with one embodiment, aspects of the disclosure can be integrated with a security offering of a cloud service provider. Cloud service providers can have access to a considerable amount of data (e.g., cloud view of all resources) for training precise classifiers or models for detecting malicious behavior. For example, a cloud service provider, such as one that provides infrastructure as a service (e.g., virtual machines), can acquire data regarding activities on many customer machines as well as labels. In other words, the scale of a cloud service provider can be exploited to gather sessions of known attacks to enable a classifier to learn the footprint of such attacks and automatically find similar malicious activity in real time, or substantially real time, with respect to user sessions and process creation events. For example, behavior resulting from a known malicious internet protocol (IP) address or interaction with a honeypot can automatically be labeled as malicious for training purposes. Further, such customer data can be offered to the cloud service provider in exchange for security services. For example, user sessions on customer machines can be analyzed and the customer can be alerted via a cloud service provider dashboard or the like if and when a malicious user session is detected.

Aspects of the subject disclosure pertain to the technical problem of computer security. The technical features associated with addressing this problem comprise automatic detection of malicious activities such as resource misappropriation and data theft, among other things, from user sessions. A classifier can be trained to automatically detect malicious computer sessions. For example, supervised and/or unsupervised machine learning can be employed to train the classifier. The classifier can then be deployed and in real time, or substantially real time, detect and alert a designated party of malicious sessions.

The subject disclosure supports various products and processes that perform, or are configured to perform, various actions regarding detection of malicious computer activity. What follows are one or more exemplary systems and methods.

A system for detecting malicious computer behavior comprises: a processor coupled to a memory, the processor configured to execute computer-executable instructions stored in the memory that when executed cause the processor to perform the following actions: identifying a user session comprising a sequence of process events; generating a text representation from the user session, wherein the process events are words and a sequence of the words is a sentence; and classifying the user session as malicious in terms of a predictive score with a text-based classifier based on the sequence of process events in the text representation. Identifying the user session further comprises identifying a login session to a network-based service. The text-based classifier is trained with activities from multiple machines of a network-based service provider. The system further comprises comparing the predictive score to a threshold and alerting a designated party of a malicious session if the predictive score exceeds the threshold. The system further comprising determining a subset of process events that contributed the most to the predictive score that exceeds the threshold and providing the subset of process events with an alert. Further, the text-based classifier implements machine learning to classify the user session as malicious or non-malicious. The text-based classifier can encode a text representation of the session in vectors. The text-based classifier comprises an artificial neural network or convolutional neural network trained to identify malicious sessions based on the process events comprising sessions.

A method performed by a system comprising at least one processor coupled to a memory storing machine-executable instructions, which, when executed by the processor, controls the system to perform acts, comprising: identifying a user session comprising a sequence of process events; generating a text representation of the user session, wherein the process events are words and a sequence of the words form sentences; and classifying the session as malicious with a predictive score with a text-based classifier based on the sequence of process events in the text representation. Identifying the user session further comprising identifying a login session to a network-based service. The method further comprising comparing the predictive score to a threshold and alerting a designated party of the malicious session classification if the predictive score exceeds the threshold. The method further comprises determining a subset of process events that contributed the most to the predictive score that exceeds the threshold and providing the subset of process events with an alert. The method further comprises classifying the session with the text-based classifier that implements machine learning. The method further comprising encoding words as vectors in an unsupervised machine learning process. The method further comprising classifying the session with the text-based classifier that implements an artificial neural network or convolutional neural network.

A system that detects malicious computer behavior comprises means for generating text representation of a user session comprising a sequence of process events, wherein the process events correspond to words and a sequence of words form a sentence; and means for classifying the user session as malicious with text-based machine learning based on the sequence of process events in the text representation. The means for classifying further comprises a means for encoding the text representation as a vector. The means for classifying further comprises a means for applying a convolutional neural network with the vector as input.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
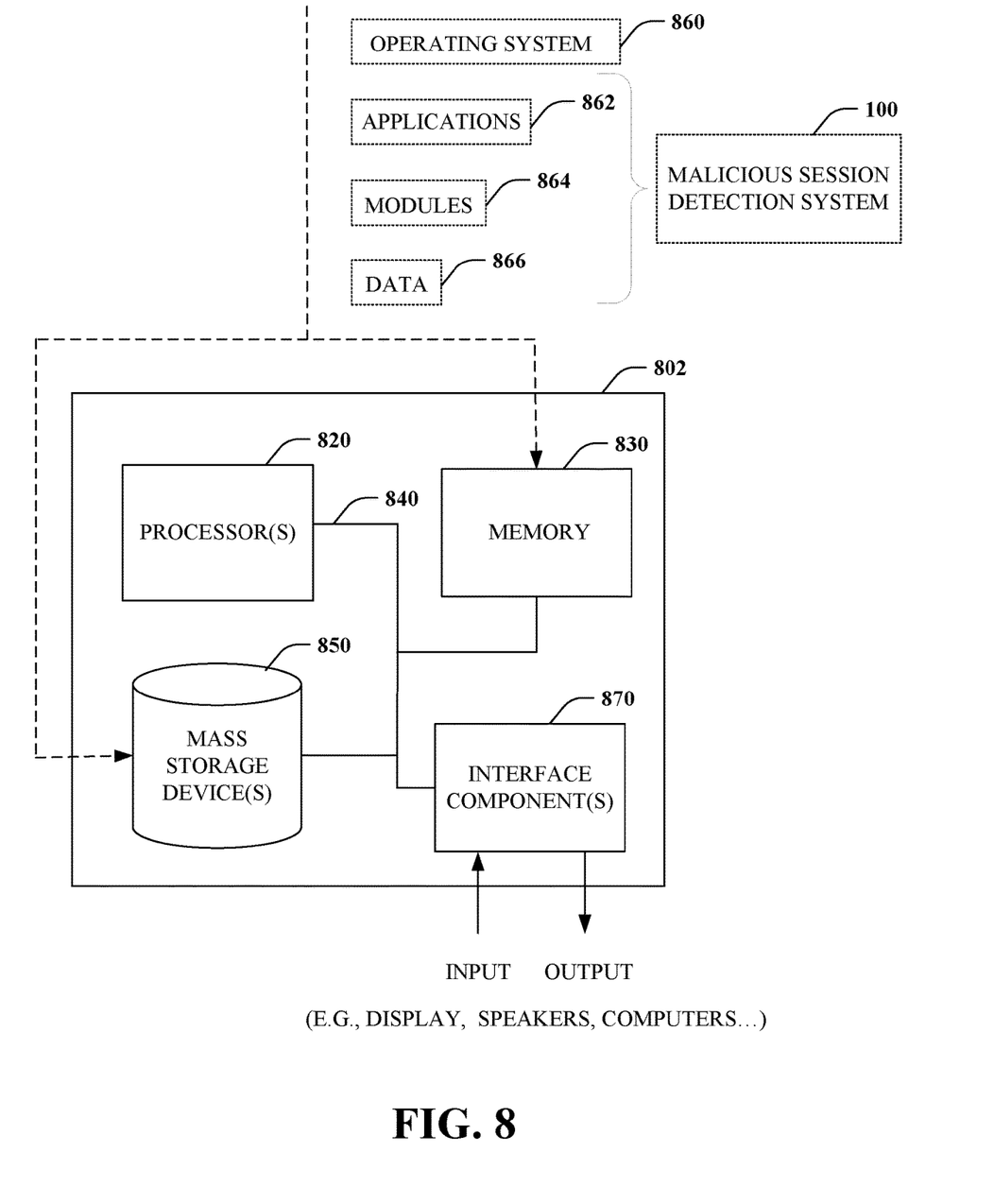
FIG. 8 is a schematic block diagram illustrating a suitable operating environment for aspects of the subject disclosure.

In order to provide a context for the disclosed subject matter, FIG. 8 as well as the following discussion are intended to provide a brief, general description of a suitable environment in which various aspects of the disclosed subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 8, illustrated is an example general-purpose computer or computing device 802 (e.g., desktop, laptop, tablet, watch, server, hand-held, programmable consumer or industrial electronics, set-top box, game system, compute node . . . ). The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830.

The processor(s) 820 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the disclosed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory . . . ) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device(s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the malicious session detection system 100, or portions thereof, can be, or form part, of an application 862, and include one or more modules 864 and data 866 stored in memory and/or mass storage device(s) 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the malicious session detection system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g. serial, parallel, PCMCIA, USB, FireWire . . . ) or an interface card (e.g., sound, video . . . ) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 870 can be embodied as an output peripheral interface to supply output to displays (e.g., LCD, LED, plasma, organic light-emitting diode display (OLED) . . . ), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system for detecting malicious computer behavior, comprising:
   a processor coupled to a memory, the processor configured to execute computer-executable instructions stored in the memory that when executed cause the processor to perform the following actions:
   identifying a first user session comprising a sequence of process events, at least one of the process events having a process name and at least one parameter;
   generating a first text representation comprising a sentence in a natural language from the first user session, wherein the generating the first text representation comprises:
      for each of the at least one process events, encoding a process name and at least one parameter corresponding to the process event into one or more words in the natural language, the one or more words encoded based on each of the at least one process events forming a sequence of words; and
      generating the sentence in the natural language based on the sequence of the words;
   determining whether the first user session is malicious;

training a text-based classifier based on the determination and the first text representation;
in response to detecting a second user session that is currently executing at least one new process,
generating a second text representation representing the second user session, including text representing the currently executing at least one new process; and
based on the second text representation, classifying, in substantially real time, the second user session as malicious or non-malicious in terms of a predictive score using the text-based classifier.

2. The system of claim 1, identifying the second user session further comprises identifying a login session to a network-based service.

3. The system of claim 2, the text-based classifier is trained with activities from multiple machines of a network-based service provider.

4. The system of claim 1 further comprising comparing the predictive score to a threshold and alerting a designated party of a malicious session if the predictive score exceeds the threshold.

5. The system of claim 4, wherein the training the text-based classifier further comprises:
in response to a determination that the first user session is malicious,
determining a process event in the first user session that has contributed the most to the maliciousness; and
in response to detecting a currently executing process corresponding to the process event in the second user session, providing an alert to a designated party.

6. The system of claim 1, the text-based classifier implements machine learning to classify the second user session as malicious or non-malicious.

7. The system of claim 6, the text-based classifier encodes the first text representation and the second text representation in vectors.

8. The system of claim 6, the text-based classifier comprises an artificial neural network trained to identify malicious sessions based on the currently executing process of sessions.

9. The system of claim 8, the artificial neural network comprises a convolutional neural network.

10. A method performed by a system comprising at least one processor coupled to a memory storing machine-executable instructions, which, when executed by the processor, controls the system to perform acts, comprising:
identifying a first user session comprising a sequence of process events, at least one of the process events having a process name and at least one parameter;
generating a first text representation of the first user session comprising a sentence in a natural language, wherein the generating the first text representation comprises:
for each of the at least one process events, encoding a process name and at least one parameter corresponding to the process event into one or more words in the natural language, the one or more words encoded based on each of the at least one process events forming a sequence of the words; and
generating the sentence in the natural language based on the sequence of the words;
determining whether the first user session is malicious;
training a text-based classifier based on the determination and the first text representation;
in response to detecting a second user session that is currently executing at least one new process,
generating a second text representation representing the second user session, including text representing the currently executing at least one new process; and
based on the second text representation, classifying, in substantially real time, the second user session as malicious or non-malicious in terms of a predictive score using the text-based classifier.

11. The method of claim 10, identifying the second user session further comprising identifying a login session to a network-based service.

12. The method of claim 10 further comprising comparing the predictive score to a threshold and alerting a designated party if the predictive score exceeds the threshold.

13. The method of claim 12, wherein the training the text-based classifier further comprises:
in response to a determination that the first user session is malicious,
determining a process event in the first user session that contributed the most to the maliciousness; and
in response to detecting a currently executing process corresponding to the process event in the second user session, providing an alert to a designated party.

14. The method of claim 10 wherein the text-based classifier implements machine learning.

15. The method of claim 14 the classifying the second user session comprising encoding words as vectors in an unsupervised machine learning process.

16. The method of claim 14 wherein the text-based classifier implements an artificial neural network.

17. The method of claim 16 wherein the text-based classifier implements a convolutional neural network.

18. A computer program product comprising one or more hardware storage devices having stored thereon computer-executable instructions that are structured such that, when executed by one or more processors of a computing system, the computer-executable instructions cause the computer system to perform the following:
generate a first text representation in a natural language of a first user session comprising a sequence of process events, at least one of the process events having a process name and at least one parameter, wherein the generating the first text representation comprises:
for each of the at least one process events, encode a process name and at least one parameter corresponding to the process event into one or more words in the natural language, the one or more words encoded based on each of the at least one process events forming a sentence; and
generate the sentence in the natural language based on the sequence of the words;
determine whether the first user session is malicious;
train a text-based machine learning classifier based on the determination and the text representation;
in response to detecting a second user session that is currently executing at least one new process,
generate a second text representation representing the second user session, including text representing the currently executing at least one new process; and
based on the second text representation, classify, in substantially real time, the second user session as malicious or non-malicious in terms of a predictive score using the text-based classifier.

19. The computer program product of claim 18, the computer-executable instructions further causing the computer system to encode the text representation as a vector.

20. The computer program product of claim 19, the text-based classifier applying a convolutional neural network with the vector as input.

* * * * *